United States Patent
Yu et al.

(10) Patent No.: US 7,084,937 B2
(45) Date of Patent: Aug. 1, 2006

(54) LIQUID CRYSTAL DISPLAY AND BACKLIGHT MODULE THEREOF WITH REFLECTIVE POLARIZER AND QUARTER WAVE PLATE

(75) Inventors: Tai-Cheng Yu, Tu-Chen (TW); Charls Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 105 days.

(21) Appl. No.: 10/680,319

(22) Filed: Oct. 6, 2003

(65) Prior Publication Data
US 2004/0105055 A1 Jun. 3, 2004

(30) Foreign Application Priority Data
Nov. 29, 2002 (TW) .............................. 91219296 U

(51) Int. Cl.
*G02F 1/1335* (2006.01)
(52) U.S. Cl. .................. 349/96; 349/117; 349/114; 349/115
(58) Field of Classification Search .................. 349/65, 349/117–119, 96–98
See application file for complete search history.

(56) References Cited

U.S. PATENT DOCUMENTS

| | | | |
|---|---|---|---|
| 5,982,464 A * | 11/1999 | Wang et al. | 349/108 |
| 5,986,730 A * | 11/1999 | Hansen et al. | 349/96 |
| 6,448,955 B1 | 9/2002 | Evanicky et al. | |
| 6,504,589 B1 | 1/2003 | Kashima et al. | |
| 6,724,446 B1 * | 4/2004 | Motomura et al. | 349/62 |
| 6,801,270 B1 * | 10/2004 | Faris et al. | 349/61 |
| 6,919,946 B1 * | 7/2005 | Allen et al. | 349/121 |

* cited by examiner

*Primary Examiner*—Andrew Schechter
*Assistant Examiner*—Richard H Kim
(74) *Attorney, Agent, or Firm*—Wei Te Chung

(57) ABSTRACT

A liquid crystal display (3) in accordance with one embodiment of the present invention includes a liquid crystal panel and a backlight module (36). The liquid crystal panel has a reflective polarizing element (342). The backlight module has a light source (361), a light guide plate (362), a reflector (365), and a quarter-wave plate (366). The light source is disposed adjacent to the light guide plate, and the reflector, the light guide plate and the quarter-wave plate are stacked together in order. The liquid crystal panel is located on the backlight module, and the reflective polarizing element of the liquid crystal panel faces toward the quarter-wave plate of the backlight module. The liquid crystal display 3 has a high brightness since light energy is efficiently used.

9 Claims, 4 Drawing Sheets

LIQUID CRYSTAL DISPLAY AND BACKLIGHT MODULE THEREOF WITH REFLECTIVE POLARIZER AND QUARTER WAVE PLATE

BACKGROUND OF THE INVENTION

1. Field of the Invention

The present invention relates to a liquid crystal display and a backlight module thereof, and particularly to a high brightness liquid crystal display and a backlight module thereof.

2. The Related Art

Conventional backlight modules for use in rear projection displays such as liquid crystal displays are classified into two types, an edge-type and a direct type, depending upon the position of the light sources in the displays. Edge-type backlight modules are usually used in liquid crystal displays because they save space due to their thinness.

One conventional liquid crystal display has a structure as shown in FIG. 5. In this figure, the liquid crystal display 1 includes a backlight module 16 and a liquid crystal panel (not labeled). The liquid crystal panel is disposed on the backlight module 16.

The liquid crystal panel comprises a first and second substrates 10 and 14, and a liquid crystal layer 12 interposed between the pair of substrates 10 and 14. The first substrate 10 includes a first glass sheet 101 and a light polarizing film 102. The second substrate 14 includes a second glass sheet 141 and a light polarizing absorption film 142. The backlight module 16 comprises a light source 161, a light guide plate 162, a brightness enhancing film 163, a diffuser 164, and a reflector 165.

FIG. 6 is a partial essential optical paths view corresponding to FIG. 5. Light beams emitted from a light source 161 are converted to a planar light beam T by the backlight module 16, and then are projected into the light polarizing absorption film 142. The planar light beams T are randomly polarized into two linear polarized light beams, an s-polarization component and a p-polarization component (denoted by arrows s and p shown in FIG. 6). The polarization state of the s-polarization component is orthogonal to that of the p-polarization component. The light polarizing absorption film 142 has a polarization axis parallel to the s-polarization component, so the s-polarization component passes. The light polarizing absorption film 142 also has an absorption axis parallel to the p-polarization component, so the p-polarization component is absorbed. Therefore, only half of the light beams T can pass through the light polarizing absorption film 142. The light energy of the light beams T is not effectively used due to the light polarizing absorption film 142 absorbing half the light beams T, and the brightness of the liquid crystal display 1 is low.

To solve the above problems, a liquid crystal display 2 shown in FIG. 7 is described in U.S. Pat. No. 6,448,955. The liquid crystal display 2 comprises a liquid crystal panel (not labeled) and a backlight module 26. The liquid crystal panel is disposed on the backlight module 26.

The liquid crystal panel is similar to that shown in FIG. 5 and includes a first and second substrates 20 and 24, and a liquid crystal layer 22 interposed between the pair of substrates 20 and 24. The backlight module 26 consists of two light sources 2611, 2612, two light guide plates 2621, 2622, a brightness enhancing film 263, a diffuser 264, a reflector 265, and a reflective polarizing element 266. The light sources 2611 and 2612 are disposed adjacent to the light guide plates 2621, 2622, respectively. The reflector 265, the light guide plates 2622, 2621, the diffuser 264, the brightness enhancing film 263, and the reflective polarizing element 266 are stacked together in order.

FIG. 8 is a partial essential light paths view corresponding to FIG. 7. Light beams T are randomly polarized, and consist of two linearly polarized light beams, an s-polarization component and a p-polarization component (denoted by arrows s and p shown in FIG. 8). A polarization state of the s-polarization component is orthogonal to that of the p-polarization component. The reflective polarizing element 266 has a polarization axis parallel to the s-polarization component, so the s-polarization component can pass. The reflective polarizing element 266 also has a reflection axis parallel to the p-polarization component, so the p-polarization component is reflected to the reflector 265. The reflected p-polarization component is partially converted to an s-polarization component, which then passes through the reflective polarizing element 266. The structure described above can reuse the reflected p-polarization component, and increases an amount of the light energy produced by the liquid crystal display 2.

Although the liquid crystal display 2 can reuse the reflected p-polarization component, the efficiency is poor due to a plurality of interfaces through which the reused reflected p-polarization component must pass. Furthermore, the liquid crystal display 2 needs an additional reflective polarizing element, so the manufacturing cost is high.

An improved liquid crystal display that overcomes the above-mentioned disadvantages is desired.

SUMMARY OF THE INVENTION

An object of the present invention is to provide a liquid crystal display having high brightness, low cost, and efficient utilization of light energy.

In order to achieve the object set forth, a liquid crystal display in accordance with one embodiment of the present invention comprises a liquid crystal panel and a backlight module. The liquid crystal panel has a reflective polarizing element, and the backlight module has a light source, a light guide plate, a reflector, and a quarter-wave plate. The light source is disposed adjacent to the light guide plate, and the reflector, the light guide plate and the quarter-wave plate are stacked together in order. The liquid crystal panel is located on the backlight module, and the reflective polarizing element of the liquid crystal panel faces toward the quarter-wave plate of the backlight module.

Other objects, advantages and novel features of the invention will become more apparent from the following detailed description when taken in conjunction with the accompanying drawings; in which:

DESCRIPTION OF THE PREFERRED EMBODIMENT(S)

Figure 1:
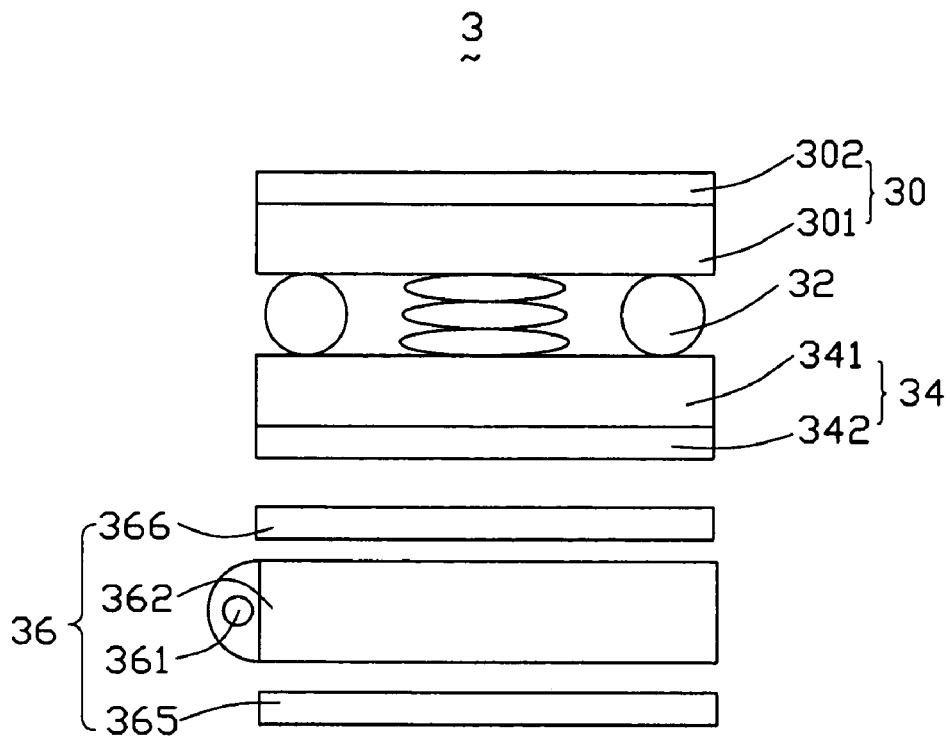
FIG. 1 is a schematic view of a first embodiment of a liquid crystal display according to the present invention.

FIG. 1 is a schematic view of a first embodiment of a liquid crystal display according to the present invention. The liquid crystal display 3 comprises a liquid crystal panel (not labeled) and a backlight module 36. The liquid crystal panel is disposed on the backlight module 36.

The liquid crystal panel comprises a first and second substrates 30 and 34, and a liquid crystal layer 32 interposed between the pair of substrates 30 and 34, wherein the first substrate 30 includes a first glass sheet 301 and a light polarizing film 302, and the second substrate 34 includes a second glass sheet 341 and a reflective polarizing element 342.

The backlight module 36 includes a light source 361, a light guide plate 362, a reflector 365, and a quarter-wave (phase retarder) plate 366. The reflector 365, the light guide plate 362, and the quarter-wave plate 366 are stacked in order. The light source 361 is disposed adjacent to the light guide plate 362.

Figure 2:
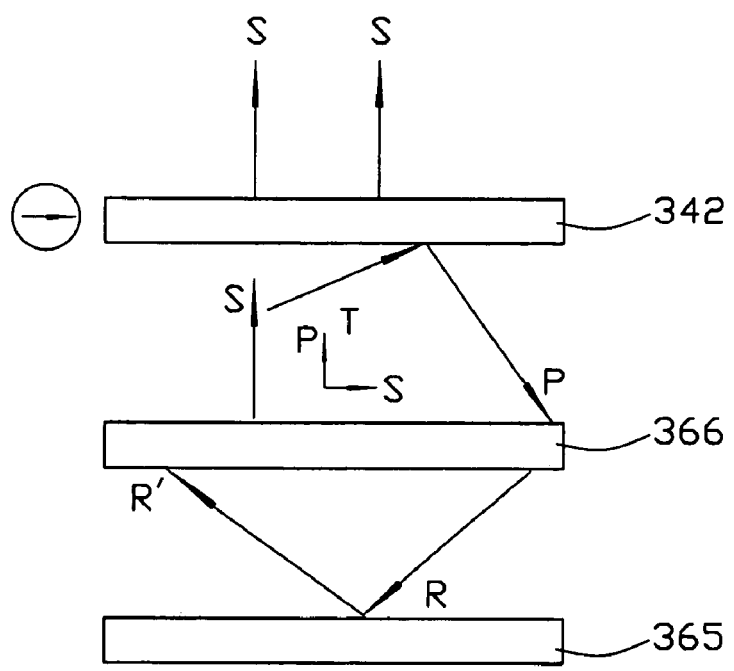
FIG. 2 is a partial essential light paths view of the liquid crystal display in FIG. 1.

FIG. 2 is a partial essential light paths view of the liquid crystal display shown in FIG. 1. Light beams emitted from the light source 361 are randomly polarized, and consist of two linearly polarized light beams, an s-polarization component and a p-polarization component (denoted by arrows s and p). The s-polarization component is orthogonal to the p-polarization component. The reflective polarizing element 342 of the liquid crystal panel has a polarization axis parallel to the s-polarization component, so the s-polarization component can pass. The reflective polarizing element 342 also has a reflection axis parallel to the p-polarization component, so the p-polarization component is reflected to the quarter-wave plate 366.

Figure 5:
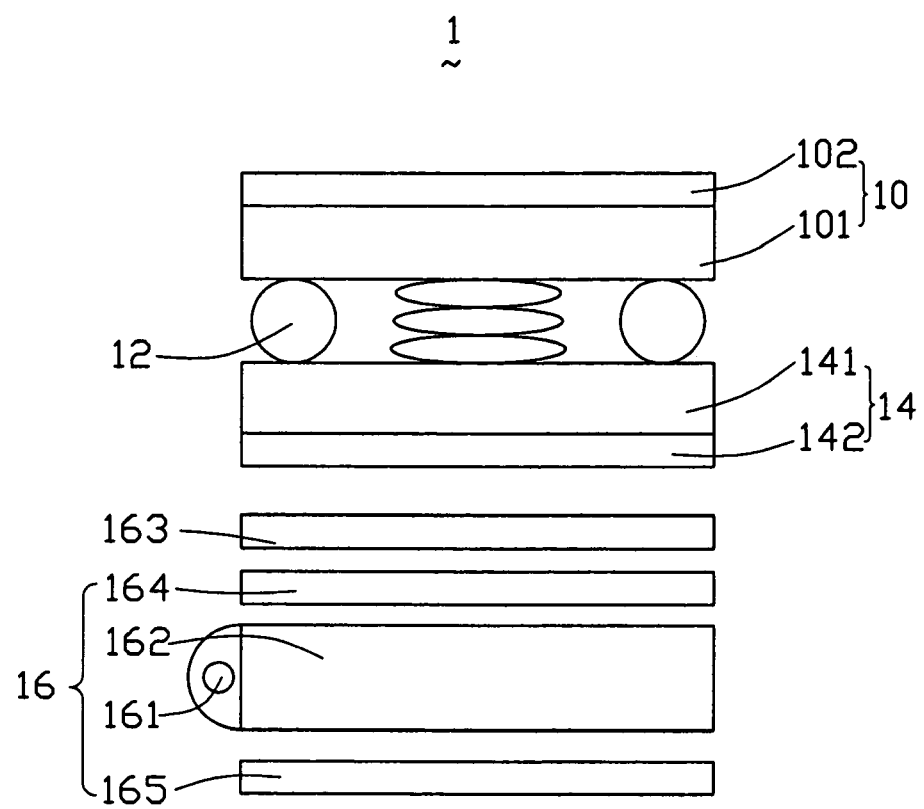
FIG. 5 is a schematic view of a conventional liquid crystal display.
Figure 6:
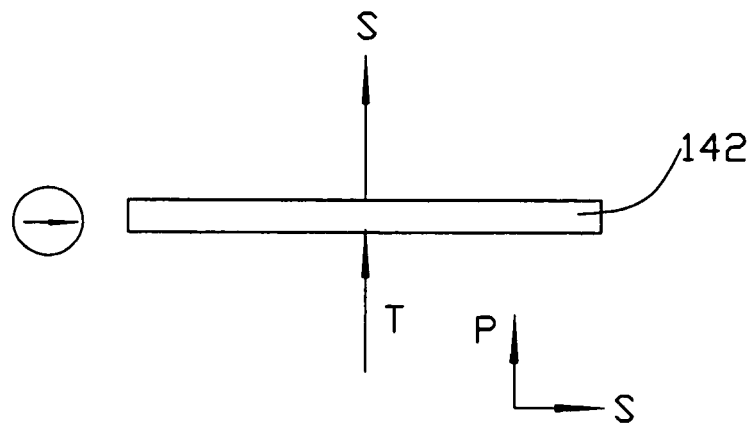
FIG. 6 is a partial essential light paths view of the liquid crystal display in FIG. 5.
Figure 7:
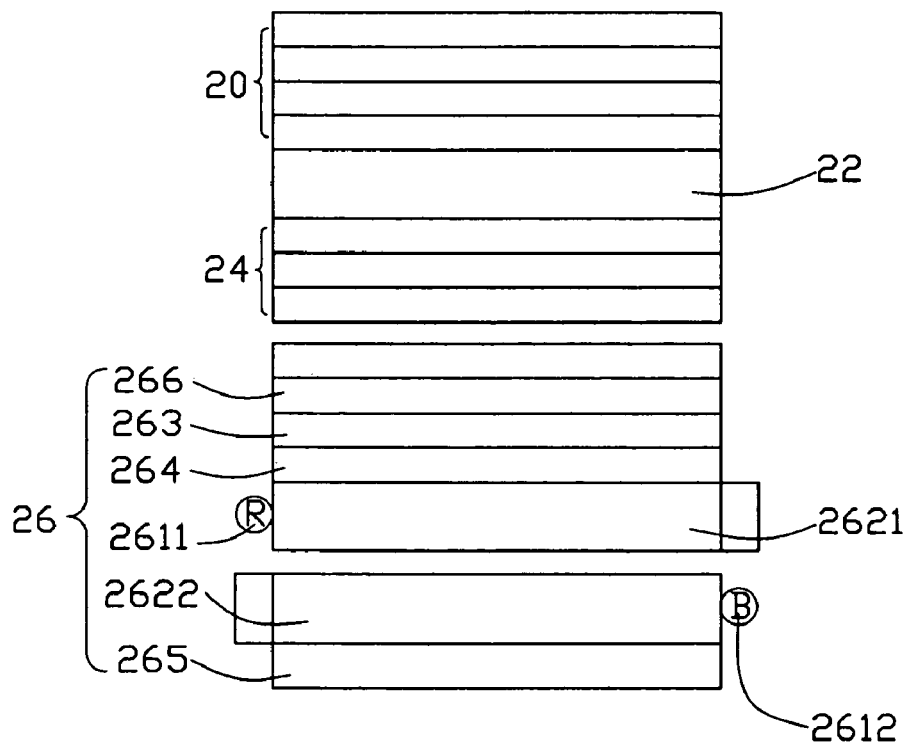
FIG. 7 is a schematic view of another conventional liquid crystal display.
Figure 8:
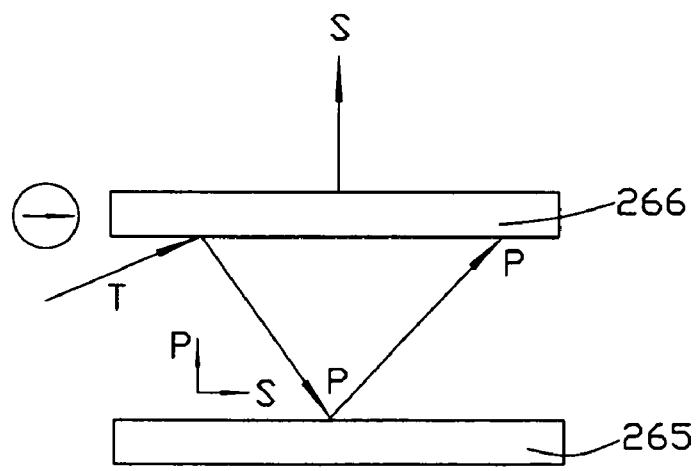
FIG. 8 is a partial essential light paths view of the liquid crystal display in FIG. 7.

The quarter-wave plate 366 is an optical element made of mica, polyvinyl alcohol, or other components, which introduces a relative phase shift of $\Delta\phi=\pi/2$ between the constituent orthogonal o-component and e-component of a wave. A phase shift of $\pi/2$ will convert linear light to circular light and vice versa. Therefore, the reflected p-polarization component is converted to a circular polarization component, when it passes through the quarter-wave plate 366 the first time. The circular polarization component is reflected by the reflector 365 and then is converted to a linear polarization component when it passes the quarter-wave plate 366 again. The linear polarization component has a polarization direction orthogonal to the reflected p-polarization component, i.e., the reflected p-polarization component is converted to an s-polarization component after passing the quarter-wave plate 366 twice. So light energy is efficiently used, and the liquid crystal display 3 has a higher brightness than that of the liquid crystal display shown in FIGS. 5 and 7.

Figure 3:
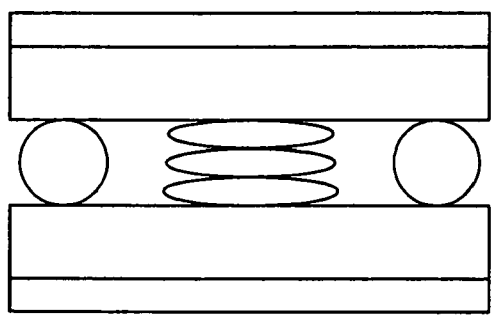
FIG. 3 is a schematic view of a second embodiment of a liquid crystal display according to the present invention.
Figure 3:
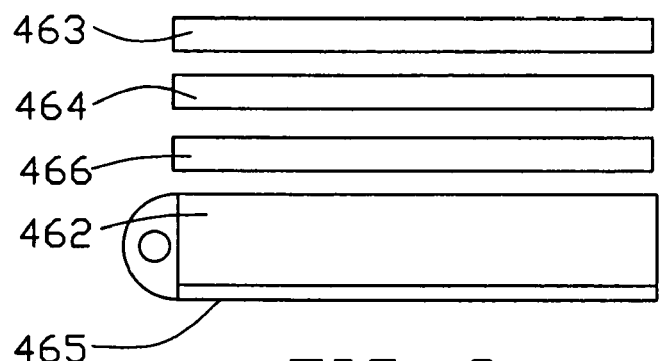

FIG. 3 illustrates a schematic view of a second embodiment of a liquid crystal display 4 according to the present invention. Compared with the liquid crystal display 3 of FIG. 1, the liquid crystal display 4 further comprises a brightness enhancing film 463 and a diffuser 464, which are disposed between the liquid crystal panel and the quarter-wave plate 466. The reflector 465 is attached to a bottom surface (not labeled) of a light guide plate 462 in order to decrease the size of the liquid crystal display 4.

Figure 4:
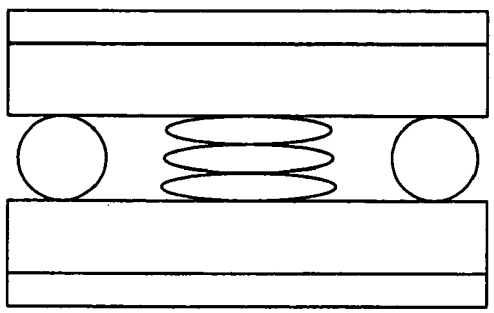
FIG. 4 is a schematic view of a third embodiment of a liquid crystal display according to the present invention.
Figure 4:
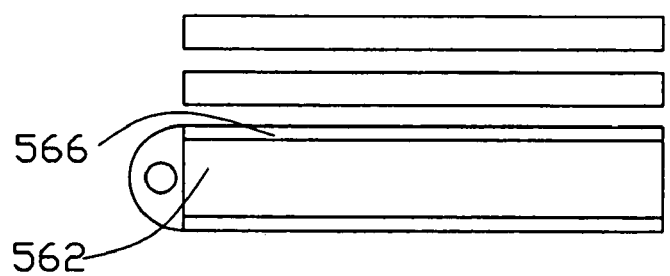

FIG. 4 illustrates a schematic view of a third embodiment of a liquid crystal display 5 according to the present invention. Compared with the backlight module 4 of FIG. 3, a quarter-wave plate 566 is attached to an upper surface (not labeled) of a light guide plate 562 to decrease the size of the liquid crystal display 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A liquid crystal display, comprising:
   a liquid crystal panel having a reflective polarizing element; and
   a backlight module having a light source, a light guide plate, a reflector, and a quarter-wave plate, the light source being disposed adjacent to the light guide plate, and the reflector, the light guide plate and the quarter-wave plate being stacked together in order;
   wherein, the liquid crystal panel is located on the backlight module, and the reflective polarizing element of the liquid crystal panel faces toward and is adjacent to the quarter-wave plate of the backlight module.

2. The liquid crystal display of claim 1, wherein the reflector is attached to a bottom surface of the light guide plate.

3. The liquid crystal display of claim 1, wherein the quarter-wave plate is attached to an upper surface of the light guide plate.

4. The liquid crystal display of claim 1, further comprising a diffuser disposed between the liquid crystal panel and the quarter-wave plate.

5. The liquid crystal display of claim 4, further comprising a brightness enhancing film disposed between the diffuser and the liquid crystal panel.

6. The liquid crystal display of claim 1, wherein the quarter-wave plate is made of mica.

7. The liquid crystal display of claim 1, wherein the quarter-wave plate is made of polyvinyl alcohol.

8. A method of making a liquid crystal display system, comprising steps of:
   providing a liquid crystal panel;
   providing a backlight module located behind the liquid crystal panel and including a light source with a light guide plate beside said light source, a quarter-wave plate and a reflector located in front of and behind said light guide plate, respectively; and
   providing one reflective polarizing element on a rear portion of the liquid crystal panel and in front of the quarter-wave plate;
   wherein reflection occurs on said reflector and said reflective polarizing element, respectively.

9. The method of claim 8, wherein in a light a p-polarization component is reflected by said reflective polarizing element, and passes the quarter-wave plate twice and the reflector once, thus resulting in a conversion of "a p-polarization component→a clockwise circular polarization component→a counterclockwise circular polarization component→an s-polarization component" before said reflected and reformed p-polarization component hits said reflective polarizing element again.

* * * * *